Nov. 20, 1962 J. C. SANDERS 3,064,418
SOLAR ROCKET WITH PEBBLE BED HEAT EXCHANGER
Filed July 7, 1960 2 Sheets-Sheet 1

INVENTOR
JOHN C. SANDERS
BY
ATTORNEY

Nov. 20, 1962 J. C. SANDERS 3,064,418
SOLAR ROCKET WITH PEBBLE BED HEAT EXCHANGER
Filed July 7, 1960 2 Sheets-Sheet 2

INVENTOR
JOHN C. SANDERS
BY
ATTORNEY

United States Patent Office 3,064,418
Patented Nov. 20, 1962

3,064,418
SOLAR ROCKET WITH PEBBLE BED HEAT EXCHANGER
John C. Sanders, 11699 Handle Drive, Strongsville 36, Ohio
Filed July 7, 1960, Ser. No. 41,456
6 Claims. (Cl. 60—26)
(Granted under Title 35, U.S. Code (1952), sec. 266)

The invention described herein may be manufactured and used by or for the Government of the United States of America for governmental purposes without the payment of any royalties thereon or therefor.

The purpose of this invention is to provide a solar powered rocket engine.

The use of radiation from the sun to heat a liquid propellant, such as liquid hydrogen, in a rocket is desirable because specific impulses considerably higher than those obtainable from conventional chemical rockets are possible. For example, a chemical rocket utilizing hydrogen and fluorine has a specific impulse of around 450 seconds, whereas by using a solar powered rocket, a specific impulse of 1770 seconds may be obtained.

A previously postulated method of utilizing the solar heat energy is to concentrate the sun's rays on a tungsten heat exchanger sufficiently to bring it to a temperature of 5550° R. which is about 1000° R. below the melting point of tungsten. Heating hydrogen in such a heat exchanger would produce a specific impulse of about 950 seconds. However, this method has one very serious limitation in that the material to be used for the construction of the heat exchanger must be capable of fabrication into passages. Thus, the temperature of the heat exchanger is limited to that of the material of construction and tungsten, the most refractory of metals, is the most probable choice for such a material. However, it is well known that solar furnaces have produced temperatures well in excess of the melting point of tungsten and have, in fact, produced temperatures up to the limits of the most refractory of all known materials, hafnium carbide.

This invention consists of utilizing as a heat exchanger in a solar powered rocket a bed of refractory particles such as hafnium carbide exposed to solar radiation through which bed the propellant fluid is passed, thus picking up heat from the particles. The propellant fluid is then allowed to escape through a nozzle to create thrust. The sun's rays are directed through windows in the rocket body and then pass on to the bed of refractory particles. In a particular embodiment of the engine, as well as in most any rocket utilizing solar power, a large collector is necessary to focus the sun's rays through the windows of the rocket on to the surface of the heat exchanger, or specifically in this case, a bed of refractory particles. There are many possible configurations that may be used for the solar collector. However, the collector is not considered part of this invention and only one configuration will be shown by way of example herein. In the invention, the bed of refractory particles may be supported by a screen or a perforated plate within the rocket chamber. In space where gravity forces cannot be depended upon to hold the bed together, rotation of the rocket chamber about its center axis may be utilized to provide a centrifugal force to aid in urging the refractory particles of the bed together.

Thus, an object of this invention is to provide a solar-powered liquid propellant rocket.

An additional object of this invention is to provide a solar-powered rocket utilizing a bed of refractory particles as the heat exchanger.

Another object of this invention is to provide a solar-powered rocket having an extremely high specific impulse.

Other objects and many attendant advantages of the present invention will be apparent from the following detailed description when taken together with the accompanying drawings in which.

Figures 1, 2:
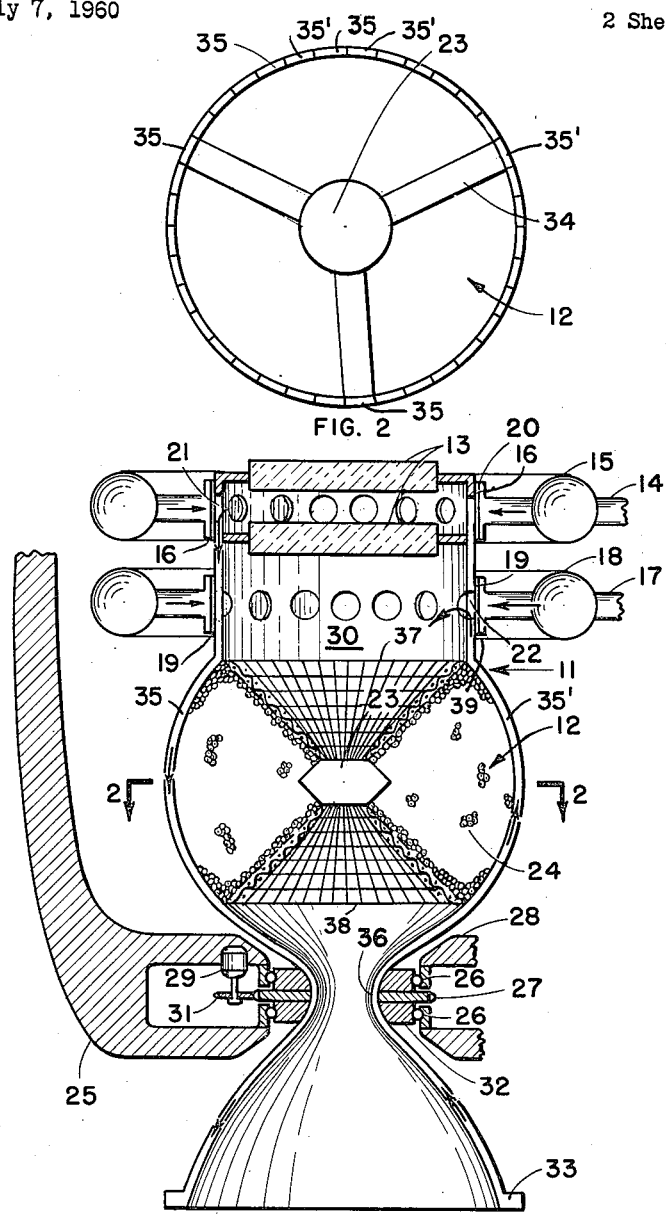
FIG. 1 is a partially-sectioned pictorial view of a solar-powered rocket engine system wherein the engine chamber may be rotated.
FIG. 2 is a view taken along line 2—2 of FIG. 1, particularly showing the cooled strut member.

Referring now to the drawings, wherein like reference characters designate like or corresponding parts throughout the several views, there is shown in FIG. 1 the rocket engine 11 which is comprised of a plurality of channels 35 and 35' defining a chamber 12. A heat exchanger 24 which may be in the form of a pebble bed of refractory material is disposed in the intermediate chamber portion of the engine 11. The heat exchanger 24 may be contained in the aforementioned chamber portion by the utilization of screens 37 and 38. Two windows 13, which are secured to the rocket engine inlet and which may also serve as lenses, admit the sun's rays to the pebble bed heat exchanger 24. These lenses or windows may be of quartz or other similar material. A propellant, which, by way of example may be hydrogen, may be pumped from a storage means, not shown, through two inlets 14 and 17. The hydrogen admitted to inlet 14 passes into an annular reservoir 15 and then on into the chamber 12. The inlet 14 and annular reservoir 15 are not fixedly attached to the rocket engine 11, but are sealed to it by a slip seal 16, thus permitting the engine to spin freely within the neck 20 of the inlet 14. A plurality of openings 21 are spaced around the circumference of the engine 11 so that the incoming fluid from the inlet 14 may be admitted to the chamber area between the lenses 13 as each opening passes by the inlet while the engine 11 is revolving. The fluid is directed between the two lenses 13 where it acts as a coolant for the lenses and then passes through the openings 21 and on into the engine wall channels associated with the openings 21. The portion of the propellant that is used to cool the wall of the engine also passes through support members 34, as seen in FIG. 2, to the strut member 23 located concentrically within the chamber and serves additionally to cool this strut member. The support members 34 for the strut 23 may be so fastened to the channels 35 and 35' so that two of the three support members carry the coolant propellant towards the strut member 23 from channels 35 while the third support member serves as a conduit to carry the coolant away from the strut 23 to channel 35'. As seen particularly in FIG. 2 the wall defining the chamber 12 consists of a plurality of channel pairs 35 and 35'. In each pair of channels, the propellant flow is toward the engine rear to the annular reservoir 33 through channel 35 and is therein reversed to flow to the engine inlet from the reservoir 33 through channel 35'. The propellant flow enters the chamber 12 between the windows 13 and heat exchanger 24 through openings 22 as better shown in FIG. 1. The portion of the propellant not used as coolant means enters through inlet 17 and passes to an annular reservoir 18 and on into the chamber through the neck 39 and openings 22. Thus, as can readily be seen, all of the propellant that will pass through the pebble bed actually enters the chamber area 30 through the openings 22. The inlet 17 is sealed to the wall of the engine 11 by a slip seal 19 which is the same as that described for the slip seal 16 used in inlet 14.

It is noted that the openings 21 are all situated in channels 35 that carry the hydrogen towards the rear of the rocket engine 11, while openings 22 are all placed in channels 35' that are carrying the propellant towards the front of the rocket engine 11. Thus the coolant portion of the propellant that will enter through inlet 14 will always pass into channels that will carry the coolant propellant to the rear of the rocket engine.

To provide for spinning the rocket engine 11 so that the pebbles of the bed 24 may be urged together, a bearing collar 32 which surrounds the throat 36 of the rocket engine is rigidly attached thereto. Urging of the refractory pebbles together provides for the maintenance of a tortuous path under zero gravity conditions, thereby maintaining a high heat transfer to the propellant flow. Concentrically within the bearing collar 32 is a gear 27. The gear 27 is driven by a gear 31 attached to a motor 29. Support means 25 and 28 serve to stabilize the rocket engine and are associated with the bearing collar 32 by means of a plurality of bearings 26. Additionally, the motor 29 that spins the rocket engine is rigidly attached to the support means 25 by any conventional means not shown.

The large increase in specific impulse potentially available with the hafnium carbide heat exchanger is due primarily to the high degree of dissociation of hydrogen at high chamber temperatures and lower pressures. As the flow expands through the nozzle, dissociation energy is released and the specific impulse will increase beyond that for no dissociation. Thus, if the advantages of dissociation are to be realized, the chamber pressure must be low and the nozzle expansion ratio large.

Figure 3:
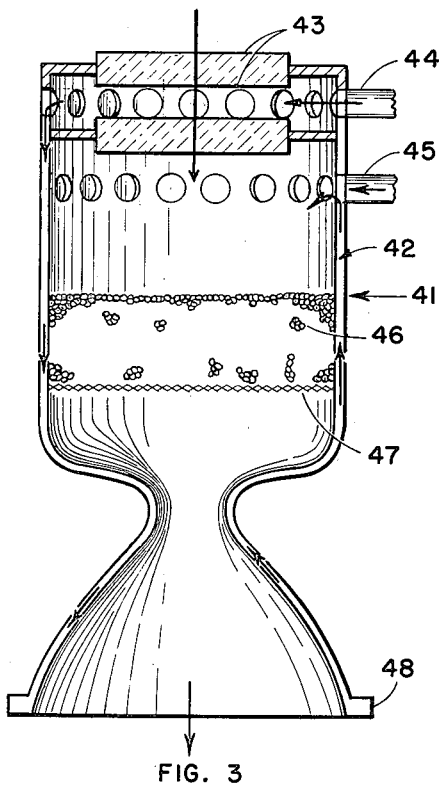
FIG. 3 is a partially-sectioned pictorial view of a solar-powered rocket wherein the pebble bed is supported by a screen.

Referring now to FIG. 3 a rocket engine 41 is shown having a pebble bed 46 in a stationary position and resting on a tungsten grid 47. A portion of the coolant propellant enters through an inlet 44 and passes between the two lenses 43 and into some of the channel members comprising the walls 42 of the engine 41. The portion of the propellant used to cool the engine wall traverses the length of the engine towards the rear and enters a reservoir 48 adjacent the rear of the engine, where the propellant is directed to channels that also comprise the wall of the engine and is directed back to enter the chamber and pass through the pebble bed 46. The portion of the propellant not used as a coolant enters through an inlet 45 which is situated in the wall of the engine 41 at a position between the lens and the pebble bed. Normally in the operation of this particular rocket engine the temperature at the top of the bed would be on the order of 500° above the melting point of tungsten and the temperature of the bed would then decrease approximately a little over 500° so that the bottom of the bed which is adjacent the tungsten grid 47 would be at a temperature just below the melting point of tungsten.

Figure 4:
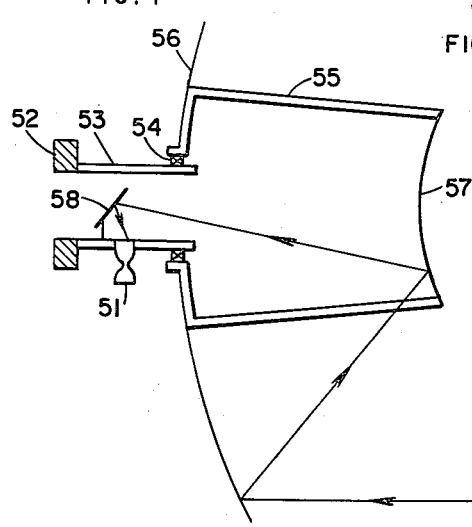
FIG. 4 is a schematic view showing a solar collector in combination with a solar-powered rocket engine.

Referring now to FIG. 4 wherein a solar engine 51 is shown in conjunction with a possible configuration for the solar collector, a large collector 56 focuses the sun's rays via a second reflector 57 and a third reflector 58 on to the pebble bed surface of the rocket engine 51. The collector 56 would most probably be of a plastic film with a silver surface. The engine 51 is attached to a first annular support means 53 which also serves to support the payload and fuel 52 and supports the third reflector 58. The collector 56 and reflector 57 are supported by a second annular support means 55. Bearing means 54 serve to separate the support means 53 from the support means 55 so that the collector 56 and reflector 57 may rotate respective to the engine 51. Hydrogen is pumped through the heat exchanger and expelled through the nozzle to form a propulsive jet. Such an arrangement as presented in this figure permits the jet nozzle to be located immediately adjacent the heat exchanger, thus circumventing the need to transmit hot gas through extensive ducting. The size of the collector required depends upon the flux density of solar radiation, the heat content of hydrogen or other propellant, the specific impulse of the hydrogen or other propellant when expanded in a jet, and the required thrust level.

Two means to contain and urge the pebbles of the refractory bed together within the rocket have been shown specifically by way of example, one being the use of centrifugal force and the other having the pebble bed rest on a grid or a screen under gravity or rocket thrust acceleration forces. A third possible means of situating the bed within the rocket chamber would be to sinter the pebbles so that a solid porous bed would be formed. Thus, placing such a bed in the rocket would obviously eliminate the need for any support grid and additionally it would not require any mechanism to spin the rocket to utilize centrifugal force. Also, two lenses for use in the rocket have been shown by way of example. Obviously, such a rocket is not limited to this quantity of lenses.

Obviously, many modifications and variations of the present invention are possible in the light of the above teachings. It is, therefore, to be understood that within the scope of the appended claims the invention may be practiced other than as specifically described.

What is claimed is:

1. In a rocket engine utilizing solar radiation, the combination of
   a wall defining a chamber, said chamber having an inlet portion, an intermediate portion and an exhaust nozzle,
   a porous sintered bed of refractory material disposed in said intermediate portion,
   admitting means on said inlet portion to admit solar radiation to said bed thereby effecting heating thereof, said bed serving to transfer heat to a propellant flowing therethrough, and
   means operably associated with said inlet portion to introduce a propellant under pressure into said chamber between said admitting means and said bed, said propellant by flowing through said bed, said propellant being heated thereby and exiting from said chamber by exhausting and expanding through said nozzle whereby thrust is produced.

2. A rocket engine utilizing solar energy comprising
   a wall defining a chamber, said chamber having an inlet portion, an intermediate portion and an exhaust nozzle,
   a pebble bed of refractory material disposed within said chamber in the intermediate portion thereof,
   means for supporting said pebble bed,
   means disposed on said inlet portion to admit solar energy rays to said pebble bed, said rays effecting heating of said pebble bed, and
   means operably associated with said chamber to admit a propellant to said chamber between said inlet portion and said bed, the propellant being admitted at a pressure to effect flow thereof through said bed, said bed serving to transfer heat to the propellant, the propellant exhausting from said chamber through said nozzle whereby thrust is produced.

3. The rocket engine, as in claim 2, wherein said bed consists of hafnium carbide pebbles.

4. In a rocket engine utilizing solar radiation, the combination of
   a wall defining a chamber, said chamber having an inlet portion, an intermediate portion and an exhaust nozzle,
   a pebble bed of refractory material disposed within said chamber in the intermediate portion thereof,
   means disposed on said inlet portion to admit solar radiation to said bed, the solar radiation effecting heating of said bed, means to supply a propellant under pressure to said chamber, said propellant flowing through said pebble bed, said propellant being heated thereby and exiting from said chamber through said exhaust nozzle whereby thrust is produced, and means to rotate said chamber to urge the pebbles of said pebble bed toward the wall of said chamber toward each other under conditions of zero gravity thereby promoting a tortuous path between the pebbles whereby high heat-transfer rate to the propellant flowing through said bed is maintained.

5. The rocket engine, as in claim 1, wherein said bed consists of hafnium carbide material.

6. The rocket engine, as in claim 4, wherein said bed consists of hafnium carbide pebbles.

References Cited in the file of this patent

UNITED STATES PATENTS

| | | |
|---|---|---|
| 1,599,481 | Marcuse | Sept. 14, 1926 |
| 1,700,675 | Goddard | Jan. 29, 1929 |
| 2,291,534 | Deppe | July 28, 1942 |
| 2,793,018 | Trombe | May 21, 1957 |
| 2,920,710 | Howard | Jan. 12, 1960 |

FOREIGN PATENTS

| | | |
|---|---|---|
| 862,843 | France | Dec. 16, 1940 |

OTHER REFERENCES

Oberth, "Wege Zur Raumschiffahrt," 1894, pp. 413–415.